United States Patent
Shibata et al.

(10) Patent No.: US 10,158,809 B2
(45) Date of Patent: Dec. 18, 2018

(54) IMAGE CAPTURING DEVICE, IMAGE SENSOR, AND METHOD OF CONTROLLING IMAGE CAPTURING DEVICE

(71) Applicant: Sony Semiconductor Solutions Corporation, Kanagawa (JP)

(72) Inventors: Yasushi Shibata, Kanagawa (JP); Katsumi Takayama, Saitama (JP); Masatsugu Fukunaga, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/509,881

(22) PCT Filed: Jul. 9, 2015

(86) PCT No.: PCT/JP2015/069746
§ 371 (c)(1),
(2) Date: Mar. 9, 2017

(87) PCT Pub. No.: WO2016/042893
PCT Pub. Date: Mar. 24, 2016

(65) Prior Publication Data
US 2017/0302861 A1   Oct. 19, 2017

(30) Foreign Application Priority Data

Sep. 17, 2014   (JP) ................................ 2014-188436

(51) Int. Cl.
*H04N 5/355*   (2011.01)
*H04N 5/265*   (2006.01)
(Continued)

(52) U.S. Cl.
CPC ........... *H04N 5/265* (2013.01); *H04N 5/2355* (2013.01); *H04N 5/355* (2013.01);
(Continued)

(58) Field of Classification Search
CPC ........... H04N 5/35536; H04N 5/35554; H04N 5/35572; H04N 5/35581
(Continued)

(56) References Cited

U.S. PATENT DOCUMENTS 7,098,946 B1 *   8/2006   Koseki ............... H04N 5/23293
                                                           348/229.1
2002/0159774 A1   10/2002   Koyama et al.
(Continued)

FOREIGN PATENT DOCUMENTS

JP   2001346096 A   * 12/2001   ............. H04N 5/235
JP   2002-320132 A   10/2002
(Continued)

*Primary Examiner* — Anthony J Daniels
(74) *Attorney, Agent, or Firm* — Wolf, Greenfield & Sacks, P.C.

(57) ABSTRACT

To prevent an increase in memory capacities in a device for performing image combination.
A data generation unit executes long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing. A compression unit compresses the long exposure data to generate compression data. A memory holds the compression data over delay time corresponding to the shorter time period of the two exposure time periods. A decompression unit decompresses the held compression data to restore the long exposure data. A combination unit combines the restored long exposure data and the short exposure data.

9 Claims, 15 Drawing Sheets

(51) Int. Cl.
*H04N 9/07* (2006.01)
*H04N 5/374* (2011.01)
*H04N 5/378* (2011.01)
*H04N 5/235* (2006.01)
*H04N 19/124* (2014.01)
*H04N 19/91* (2014.01)
*H04N 19/42* (2014.01)
*H04N 19/59* (2014.01)

(52) U.S. Cl.
CPC ......... *H04N 5/35581* (2013.01); *H04N 5/374* (2013.01); *H04N 5/378* (2013.01); *H04N 9/07* (2013.01); *H04N 19/124* (2014.11); *H04N 19/42* (2014.11); *H04N 19/59* (2014.11); *H04N 19/91* (2014.11)

(58) Field of Classification Search
USPC .............................................. 348/221.1, 362
See application file for complete search history.

(56) References Cited

U.S. PATENT DOCUMENTS

| | | | | |
|---|---|---|---|---|
| 2011/0128411 | A1* | 6/2011 | Masubuchi | H04N 5/2355 348/231.99 |
| 2012/0044422 | A1* | 2/2012 | Peacock | H04N 19/117 348/608 |
| 2013/0202202 | A1* | 8/2013 | Hasu | G06T 3/4053 382/166 |
| 2013/0235257 | A1 | 9/2013 | Kaida et al. | |
| 2015/0098499 | A1* | 4/2015 | Tominaga | H04N 5/23229 375/240.02 |

FOREIGN PATENT DOCUMENTS

| | | |
|---|---|---|
| JP | 2009-088927 A | 4/2009 |
| JP | 2011-119868 A | 6/2011 |
| JP | 2013-179584 A | 9/2013 |
| JP | 2013-187681 A | 9/2013 |

\* cited by examiner a b a b a b

IMAGE CAPTURING DEVICE, IMAGE SENSOR, AND METHOD OF CONTROLLING IMAGE CAPTURING DEVICE

CROSS-REFERENCE TO RELATED APPLICATIONS

This Application is a national stage filing under 35 U.S.C. 371 of International Patent Application Serial No. PCT/JP2015/069746, filed Jul. 9, 2015, titled "IMAGE PICKUP DEVICE, IMAGE PICKUP ELEMENT, AND IMAGE PICKUP DEVICE CONTROL METHOD". Foreign priority benefits are claimed under 35 U.S.C. § 119(a)-(d) or 35 U.S.C. § 365(b) of Japanese application number 2014-188436, filed Sep. 17, 2014.

TECHNICAL FIELD

The present technology relates to image capturing devices, image sensors, and method of controlling the image capturing device. More specifically, the present technology relates to an image capturing device, image sensor, and method of controlling the image capturing device, capable of performing image combination.

BACKGROUND ART

In related art, image combination technique called wide dynamic range combination is employed to implement a wider dynamic range than usual in an image capturing device. In one example, an image capturing device that combines images generated by performing long exposure having relatively longer exposure time and then performing short exposure having relatively shorter exposure time is developed (e.g. refer to Patent Literature 1). In this image capturing device, each line in the image generated by the long exposure is held in a memory and is read out in synchronization with the timing at which the short exposure is terminated.

Then, when the short exposure is terminated, the image capturing device combines images using pixel data at the time of long exposure for a pixel having luminance lower than a threshold and using pixel data at the time of short exposure for a pixel having luminance higher than the threshold. This allows generation of an image having a dynamic range wider than the case of no combined image.

CITATION LIST

Patent Literature

Patent Literature 1: JP 2009-088927A

DISCLOSURE OF INVENTION

Technical Problem

In the related art described above, however, the number of lines to be held in a memory increases as the exposure time of short exposure increases, thereby increasing necessary memory capacity unfavorably. Furthermore, as the amount of data per line increases with the improvement in resolution or the like, necessary memory capacity increases disadvantageously.

The present technology is made in view of such a situation, and an object thereof is to prevent an increase in memory capacities in a device for performing image combination.

Solution to Problem

The present technology has been made in order to solve the above-mentioned problem, and an aspect of the present technology is to provide an image capturing device including: a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing; a compression unit configured to compress the long exposure data to generate compression data; a memory configured to hold the compression data over delay time corresponding to the shorter time period of the two exposure time periods; a decompression unit configured to decompress the held compression data to restore the long exposure data; and a combination unit configured to combine the restored long exposure data and the short exposure data, and a method of controlling the image capturing device. Accordingly, this leads to the effect that the long exposure data is compressed and held in the memory, and the restored long exposure data and the short exposure data are combined.

According to the first aspect, the compression unit may compress the long exposure data at a compression ratio that is set to be lower as the delay time is shorter. Accordingly, this leads to the effect that the long exposure data is compressed at a compression ratio that is set to be lower as the delay time is shorter.

According to the first aspect, each of the plurality of pixel data items may have a data size that is a predetermined size, the compression unit may allow the data size of each of the plurality of pixel data items in the long exposure data to be smaller than the predetermined size, and the decompression unit may set the data size of each of the pixel data items in the compression data back to the predetermined size. Accordingly, this leads to the effect that the data size of each of the plurality of pixel data items in the long exposure data to be smaller than the predetermined size.

According to the first aspect, the compression unit may thin out a predetermined number of the pixel data items in the long exposure data, and the decompression unit may interpolate new pixel data of the predetermined number in the compression data. Accordingly, this leads to the effect that the predetermined number of pixel data items in the long exposure data is thinned out.

According to the first aspect, each of the plurality of pixel data items may include one of pixel values of red, green, and blue, the compression unit may generate a chrominance signal and a luminance signal from each of the pixel values, and the decompression unit may generate each of the pixel values of red, green, and blue from the chrominance signal and the luminance signal. Accordingly, this leads to the effect that the chrominance signal and the luminance signal are generated from each of the pixel values of red, green, and blue.

According to the first aspect, the compression unit may perform frequency conversion on the long exposure data, and the decompression unit may perform inverse frequency conversion on the compression data. Accordingly, this leads to the effect that the frequency conversion is performed on the long exposure data.

According to the first aspect, the compression unit may encode each of the plurality of pixel data items in the long exposure data into an entropy code, and the decompression unit may decode each of the entropy codes into the pixel data. Accordingly, this leads to the effect that each of the plurality of pixel data items is encoded into an entropy code.

According to the first aspect, the data generation unit may include a plurality of pixels provided on a first substrate, and a data generation circuit configured to execute the long exposure processing and the short exposure processing on a second substrate being different from the first substrate. Accordingly, this leads to the effect that the plurality of pixels are provided on the first substrate and the data generation circuit is provided on the second substrate.

According to a second aspect of the present technology, there is provided an image sensor including: a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing; a compression unit configured to compress the long exposure data to generate compression data; a memory configured to hold the compression data over delay time corresponding to the shorter time period of the two exposure time periods; a decompression unit configured to decompress the held compression data to restore the long exposure data; and a combination unit configured to combine the restored long exposure data and the short exposure data. Accordingly, this leads to the effect that the long exposure data is compressed and held in the memory, and the restored long exposure data and the short exposure data are combined.

Advantageous Effects of Invention

According to the present technology, an excellent effect that the increase in memory capacity in a device for performing image combination can be prevented is achieved. Moreover, the advantageous effect described above is not limited thereto, but may be any effect described herein.

MODE(S) FOR CARRYING OUT THE INVENTION

The description of the best modes for carrying out the present technology (referred to as an embodiment hereinafter) will be given. The description is given in the following order.

1. First Embodiment (example of compressing and holding long exposure data)
2. Second Embodiment (example of compressing and holding long exposure data in image sensor)
3. Third Embodiment (example of compressing and holding long exposure data from image sensor on stacked substrates)

1. First Embodiment

[Exemplary Configuration of Image Capturing Device]

Figure 1:
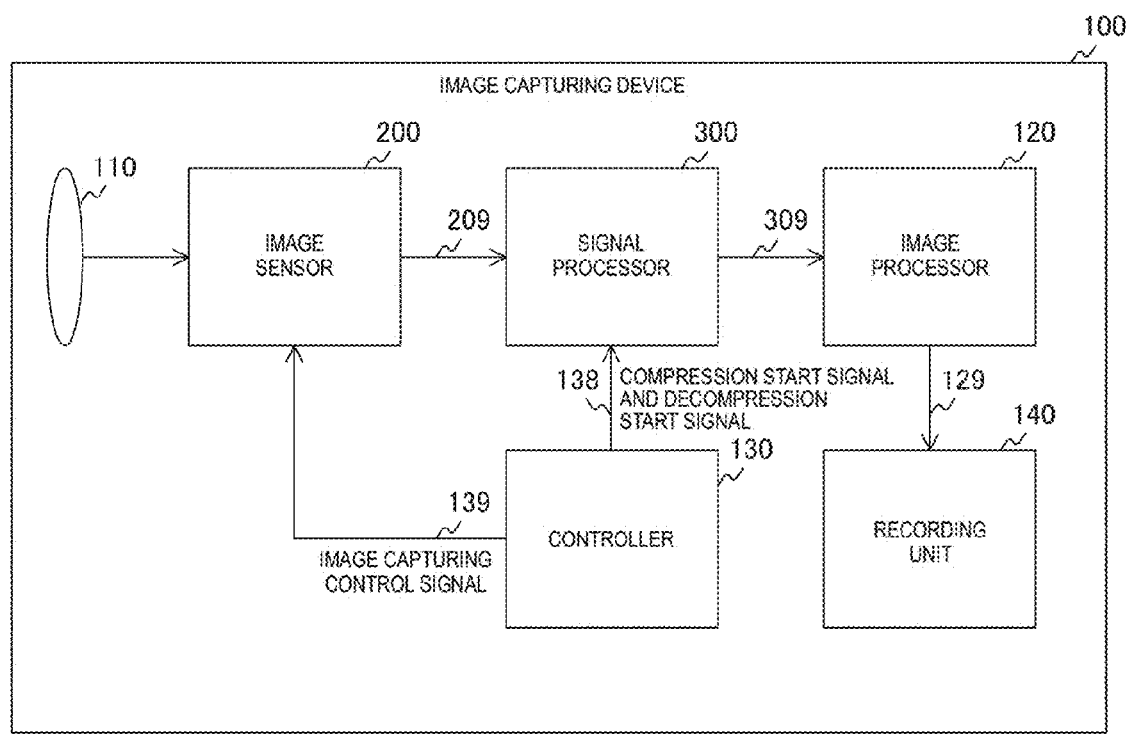
FIG. 1 is a block diagram illustrating an exemplary configuration of an image capturing device in a first embodiment.

FIG. 1 is a block diagram illustrating an exemplary configuration of an image capturing device 100 according to a first embodiment. The image capturing device 100 is a device that captures image data, and is configured to include an image capturing lens 110, an image sensor 200, a signal processor 300, an image processor 120, a controller 130, and a recording unit 140.

The image capturing lens 110 is a lens that collects light from a subject and guides it to the image sensor 200.

The image sensor 200 converts the received light into electrical signals to generate image data. Examples of the image sensor 200 include a complementary metal-oxide-semiconductor (CMOS) sensor. When the image data is generated, the image sensor 200 performs long exposure and short exposure in sequence under the control of the controller 130. In this description, the long exposure is exposure having an exposure time longer than that of the short exposure, and the short exposure is exposure having an exposure time shorter than that of the long exposure. The exposure time of long exposure is denoted as Te1 (in seconds), and the exposure time of short exposure is denoted as Te2 (in seconds). The short exposure is set to be performed after the long exposure.

The image sensor 200 performs a process of generating line data to be used as long exposure data by long exposure a predetermined number of times. In this description, the line data refers to data that is generated by a plurality of pixels arranged along a predetermined direction. The line data includes a plurality of pixel data items. Each of the pixel data items indicates a luminance value of any one of red, green, and blue, in one example. A red luminance value is denoted as pixel data R (red), a green luminance value is denoted as pixel data G (green), and a blue luminance value is denoted as pixel data B (blue).

Furthermore, the image sensor 200 generates the line data to be used as short exposure data by the short exposure whenever the long exposure data is generated. Then, the image sensor 200 supplies the long exposure data and the short exposure data to the signal processor 300 over a signal line 209. The image sensor 200 is an example of a data generation unit described in the claims.

The signal processor 300 combines the long exposure data and the short exposure data. The signal processor 300 compresses the long exposure data, holds it over a delay time corresponding to the exposure time Te2, decompresses the data, and restores the long exposure data. Then, the signal processor 300 combines the restored long exposure data and the short exposure data to generate the line data. The signal processor 300 supplies image data composed of each of the generated line data to the image processor 120 over a signal line 309.

The image processor 120 performs predetermined image processing on the image data from the signal processor 300. In one example, various types of image processing including white balancing, gamma correction, and demosaicing are performed. The image processor 120 supplies image data that is subject to the image processing to the recording unit 140 over a signal line 129. The recording unit 140 records the image data.

The controller 130 controls the entire image capturing device 100. The controller 130 controls the image sensor 200 using an image capturing control signal so that the image sensor 200 may generate the image data. The image capturing control signal, in one example, is a signal that includes an exposure control signal and a vertical synchronization signal, and is supplied over a signal line 139. In this description, the exposure control signal is a signal used to control an exposure time, and the vertical synchronization signal is a signal used to indicate image capturing timing. Furthermore, the controller 130 generates a compression start signal and a decompression start signal and supplies them to the signal processor 300 over a signal line 138. In this description, the compression start signal is a signal used to indicate compression start timing of the long exposure data, and the decompression start signal is a signal used to indicate decompression timing of the compressed long exposure data.

Moreover, the image capturing device 100 may be configured to further include a display unit on which the image data is displayed. Furthermore, the image capturing device 100 may be configured to further include an interface through which the image data is outputted to an external device.

Furthermore, although the image capturing lens 110, the image sensor 200, the signal processor 300, the image processor 120, the controller 130, and the recording unit 140 are provided in the same device, these components may be provided in their respective separate devices. In one example, the image processor 120 may be provided in an image processing device or the like, and the image sensor 200 and others are provided in the image capturing device 100.

[Exemplary Configuration of Image Sensor]

Figure 2:
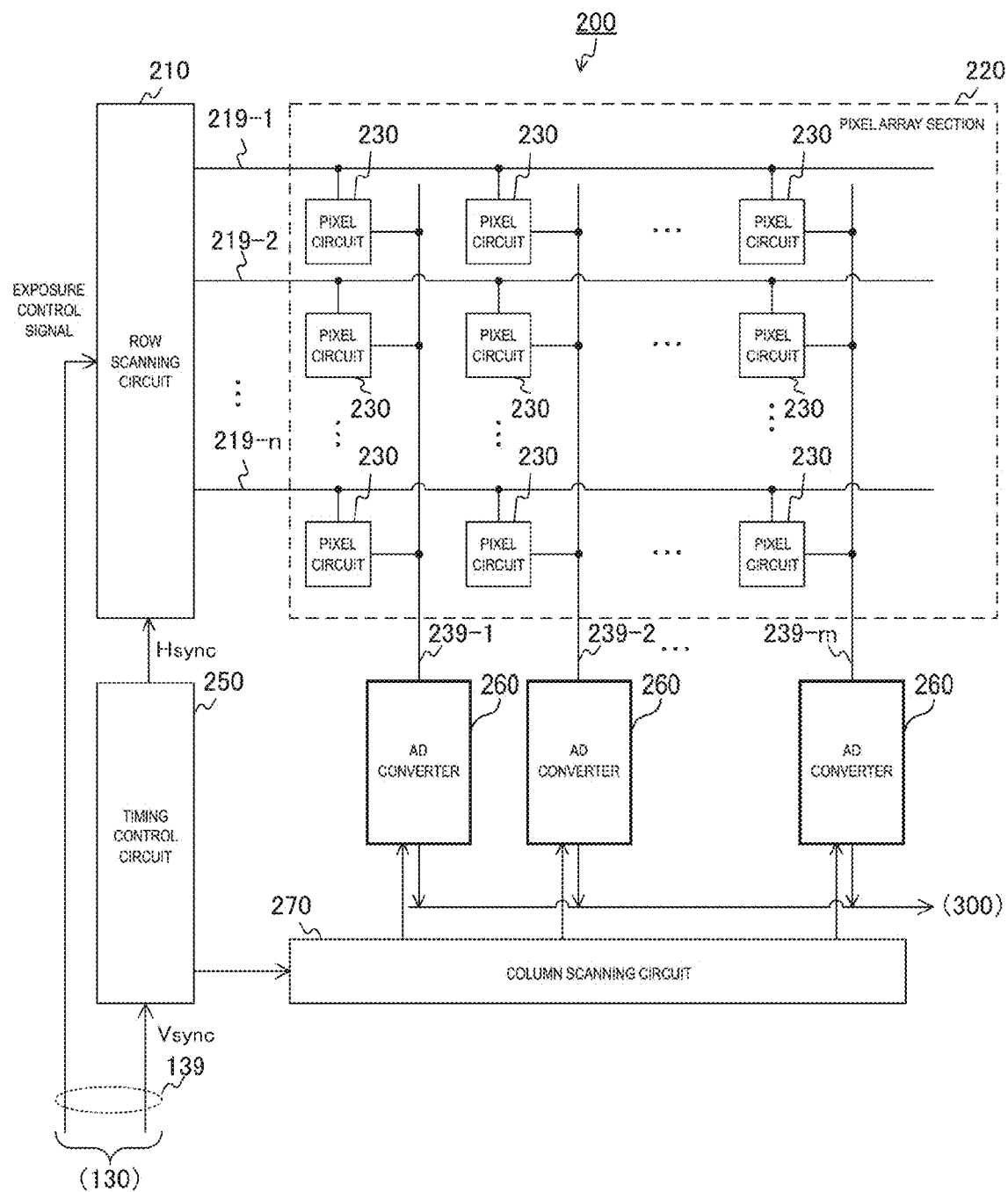
FIG. 2 is a block diagram illustrating an exemplary configuration of an image capturing device in a first embodiment.

FIG. 2 is a block diagram illustrating an exemplary configuration of the image sensor 200 in the first embodiment. The image sensor 200 is configured to include a row scanning circuit 210, a pixel array section 220, a timing control circuit 250, an analog to digital (AD) converter 260, and a column scanning circuit 270. The pixel array section 220 is composed of a plurality of pixel circuits 230 arranged in a two-dimensional grid.

The timing control circuit 250 is configured to control scanning timing of rows and columns. In this regard, the row is composed of a plurality of pixel circuits 230 arranged in any one direction in the pixel array section 220, and is also called a line. Furthermore, the column is composed of the plurality of pixel circuits 230 arranged in the direction perpendicular to the row in the pixel array section 220. The pixel circuits 230 having n rows and m columns are arranged in the pixel array section 220, where n and m are integers.

The timing control circuit 250 generates a horizontal synchronization signal Hsync that indicates timing to scan rows in synchronization with a vertical synchronization signal Vsync and supplies it to the row scanning circuit 210. Furthermore, the timing control circuit 250 generates a timing signal indicating timing to scan columns in synchronization with the horizontal synchronization signal Hsync and supplies it to the column scanning circuit 270.

The row scanning circuit 210 is configured to select each of rows in synchronization with the horizontal synchronization signal Hsync. The row scanning circuit 210 selects a row by outputting a row selection signal to each of rows in sequence over signal lines 219-1 to 219-n.

Furthermore, the row scanning circuit 210 allows each of rows to be exposed in accordance with the exposure control signal each time the rows are selected. The row scanning circuit 210 starts the long exposure for the first row when a predetermined time less than the period of the vertical synchronization signal elapses from the image capturing timing indicated by the vertical synchronization signal. The second and subsequent long exposures are started when a time of 1/fs seconds from starting the exposure of the immediately preceding row elapses, where fs is a frequency of the vertical synchronization signal Hsync. Then, the row scanning circuit 210 terminates the long exposure of the row at the elapse of Te1 seconds from starting the exposure of each row.

Furthermore, the row scanning circuit 210, when completing the read-out operation of long exposure data in each row, starts the short exposure of the row. Then, the row scanning circuit 210 terminates the short exposure of the row at the elapse of Te2 seconds from starting the short exposure of each row.

The pixel circuit 230 generates a pixel signal of a potential corresponding to an exposure time. The pixel circuit 230 supplies the generated pixel signal to the AD converter 260 over a signal line of a corresponding column among line signal lines 239-1 to 239-m.

The AD converter 260 is configured to analog-to-digital convert the pixel signal to generate pixel data. The AD converter 260 is provided for each column. The AD converter 260 of a column selected by the column scanning circuit 270 supplies the generated pixel data to the signal processor 300.

The column scanning circuit 270 is configured to select each of the rows in accordance with a timing signal. The column scanning circuit 270 selects a column by outputting a column selection signal to each of the AD converters 260 in sequence in accordance with the timing signal.

[Exemplary Configuration of Pixel Circuit]

Figure 3:
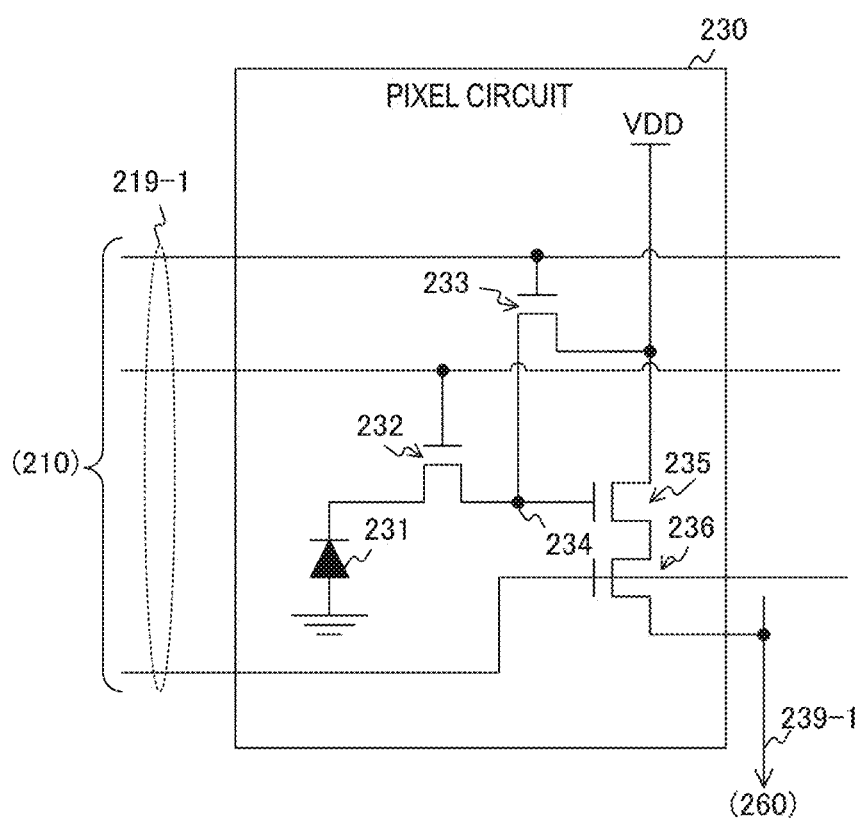
FIG. 3 is a circuit diagram illustrating an exemplary configuration of a pixel circuit according to the first embodiment.

FIG. 3 is a circuit diagram illustrating an exemplary configuration of the pixel circuit 230 according to the first embodiment. The pixel circuit 230 is configured to include a photodiode 231, a transfer transistor 232, a reset transistor 233, a floating diffusion layer 234, an amplification transistor 235, and a selection transistor 236. The transfer transistor 232, the reset transistor 233, the amplification transistor 235, and the selection transistor 236 are composed of an n-type metal-oxide-semiconductor (MOS) transistor, in one example.

The photodiode 231 is connected to the source of the transfer transistor 232. The gate of the transfer transistor 232 is connected to the row scanning circuit 210 and the drain thereof is connected to the floating diffusion layer 234. In the reset transistor 233, the gate is connected to the row scanning circuit 210, the source is connected to the floating diffusion layer 234, and the drain is connected to the power supply. In the amplification transistor 235, the gate is connected to the floating diffusion layer 234, the source is connected to the power supply, and the drain is connected to the source of the selection transistor 236. In the selection transistor 236, the gate is connected to the row scanning circuit 210 and the drain is connected to the AD converter 260.

The photodiode 231 converts light into electric charge. The transfer transistor 232 transfers the electric charge converted by the photodiode 231 to the floating diffusion layer 234. The reset transistor 233 resets the quantity of electric charge of the floating diffusion layer 234 to an initial value. The floating diffusion layer 234 generates electric potential of a level corresponding to the quantity of transferred electric charge. The amplification transistor 235 amplifies the electric potential of the floating diffusion layer 234. The selection transistor 236 outputs an electrical signal of the amplified electric potential to be used as a pixel signal to the AD converter 260 when the pixel circuit 230 is selected.

The row scanning circuit 210 selects the pixel circuit 230 by applying a high-level voltage to the selection transistor 236. Furthermore, the row scanning circuit 210 causes the exposure to be started by applying a high-level voltage to the reset transistor 233 during a fixed pulse period. If the exposure time expires, then the row scanning circuit 210 causes the exposure to be terminated by applying a high-level voltage to the transfer transistor 232 during a fixed pulse period. Such control allows an electrical signal of an electric potential corresponding to the exposure time to be generated.

[Exemplary Configuration of Signal Processing Circuit]

Figure 4:
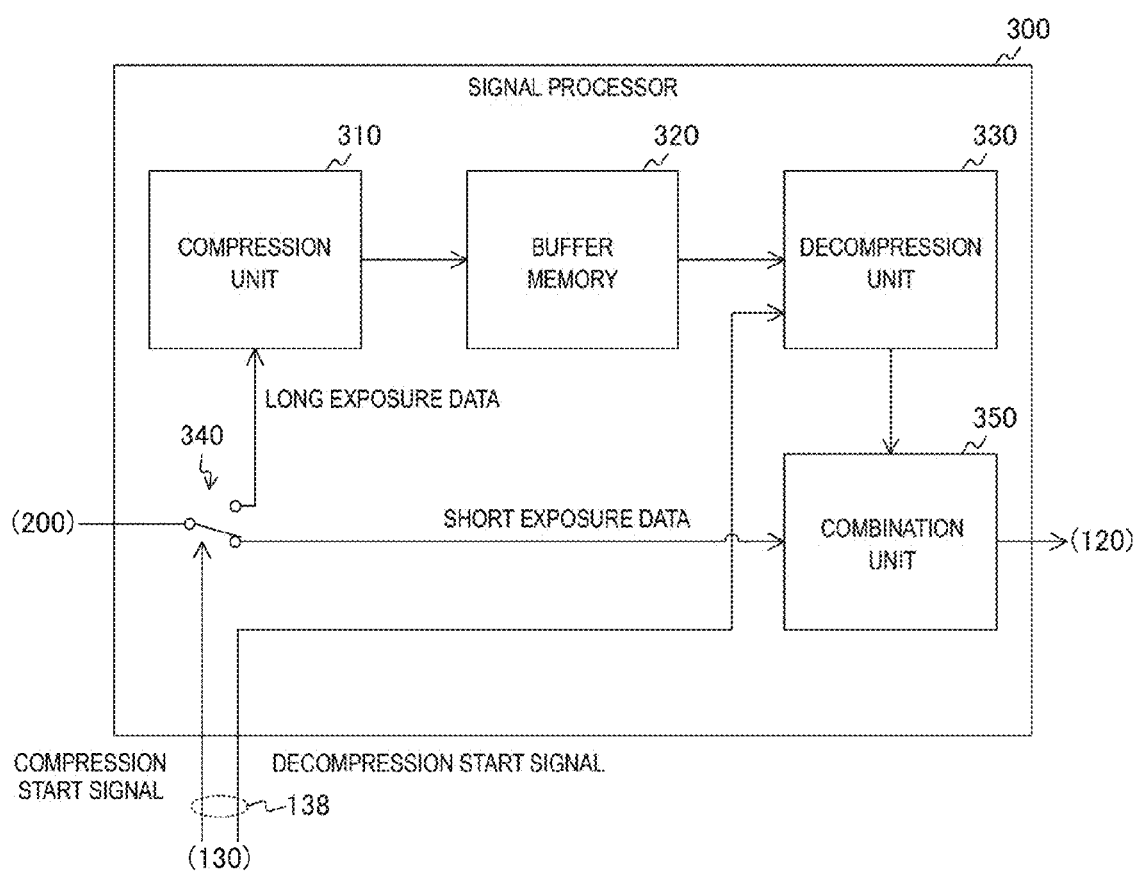
FIG. 4 is a block diagram illustrating an exemplary configuration of a signal processor according to the first embodiment.

FIG. 4 is a block diagram illustrating an exemplary configuration of the signal processor 300 according to the first embodiment. The signal processor 300 is configured to include a compression unit 310, a buffer memory 320, a decompression unit 330, a switching unit 340, and a combination unit 350.

The switching unit 340 switches a destination of the line data to be outputted from the image sensor 200 in accordance with a compression start signal. In this description, the compression start signal is set to a high level over the exposure time of the short exposure but is set to a low level over the other periods of time. If the compression start signal is set to a high level, the switching unit 340 outputs the line data to be used as the long exposure data to the compression unit 310. On the other hand, if the compression start signal is set to a low level, the switching unit 340 outputs the line data to be used as the short exposure data to the combination unit 350.

The compression unit 310 compresses the long exposure data at a fixed compression ratio to generate compression data. The compression unit 310 supplies the generated compression data to the buffer memory 320.

The buffer memory 320 holds the compression data over a delay time (Te2−Tc−Td). The buffer memory 320 is composed of static random access memory (SRAM), in one example. In this description, Tc is the time necessary to compress the long exposure data, and Td is the time necessary to decompress the compression data. Furthermore, the buffer memory 320 may be composed of a memory having memory capacity that satisfies the following Formula. The memory capacity is in units of bytes, in one example.

$$(\text{memory capacity}) \geq k \times D \qquad \text{Formula (1)}$$

In the above Formula, D is the data size of the compression data, and is in units of bytes, in one example, and k is the maximum number of line data held in the buffer memory 320, and the maximum value that satisfies the following Formula is set in k.

$$K/fs \leq (Te2-Tc-Td) \qquad \text{Formula (2)}$$

Moreover, the buffer memory 320 is an example of a memory described in the claims.

The decompression unit 330 decompresses the compression data in accordance with a decompression start signal and restores the long exposure data. The decompression start signal indicates the timing at which a time (Te2+Tr−Td) elapses from starting the short exposure as the decompression start timing, in one example. The decompression unit 330 supplies the long exposure data restored by decompression to the combination unit 350.

The combination unit 350 combines the long exposure data and the short exposure data. For each pixel data in the long exposure data, in one example, the combination unit 350 determines whether its pixel value is larger than or equal to a predetermined threshold. If it is less than the threshold, the combination unit 350 selects the pixel data in the long exposure data and outputs it. If it is larger than or equal to the threshold, the combination unit 350 selects the corresponding pixel data in the short exposure and outputs it.

[Exemplary Configuration of Compression Unit]

Figure 5:
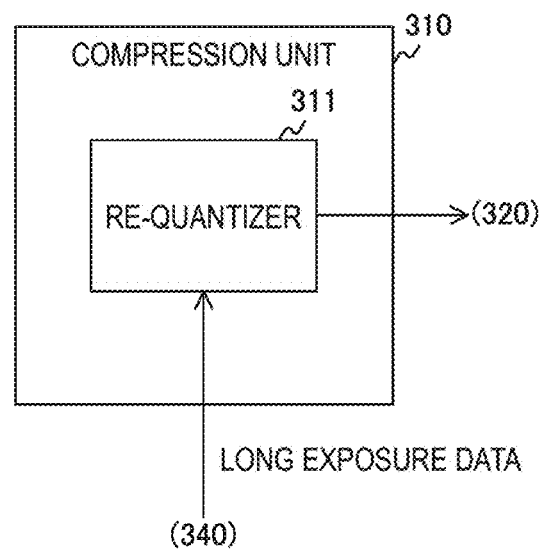
FIG. 5 is a block diagram illustrating an exemplary configuration of a compression unit and a decompression unit according to the first embodiment.
Figure 5:
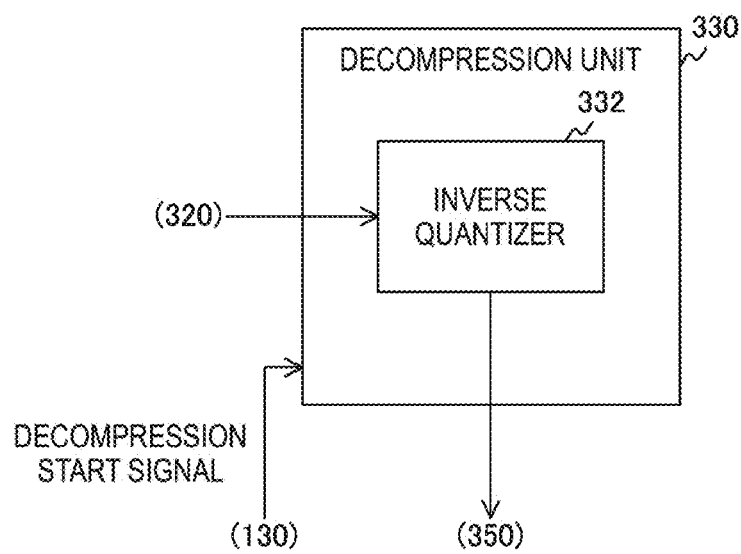

FIG. 5 is a block diagram illustrating an exemplary configuration of the compression unit 310 and the decompression unit 330 according to the first embodiment. In this figure, the portion a is a block diagram illustrating an exemplary configuration of the compression unit 310 according to the first embodiment. The compression unit 310 is configured to include a re-quantizer 311.

The re-quantizer 311 performs a process of decreasing the data size of each of pixel data items in the long exposure data as re-quantization processing. In one example, the re-quantizer 311 re-quantizes 12-bit pixel data into 10-bit pixel data. The re-quantizer 311 supplies the long exposure data that is subject to the re-quantization processing to the buffer memory 320.

Moreover, the compression unit 310 may further perform entropy encoding such as Huffman coding and arithmetic coding.

[Exemplary Configuration of Decompression Unit]

In FIG. 5, the portion b is a block diagram illustrating an exemplary configuration of the decompression unit 330 according to the first embodiment. The decompression unit 330 is configured to include an inverse quantizer 332.

The inverse quantizer 332 performs a process of returning the data size of pixel data in the compression data to the original size as inverse quantization processing. In one example, the inverse quantizer 332 inverse-quantizes 10-bit pixel data into 12-bit pixel data to restore the long exposure data. The inverse quantizer 332 supplies the restored long exposure data to the combination unit 350.

Moreover, the decompression unit 330 may further perform decoding of an entropy code such as Huffman code and arithmetic code.

Figure 6:
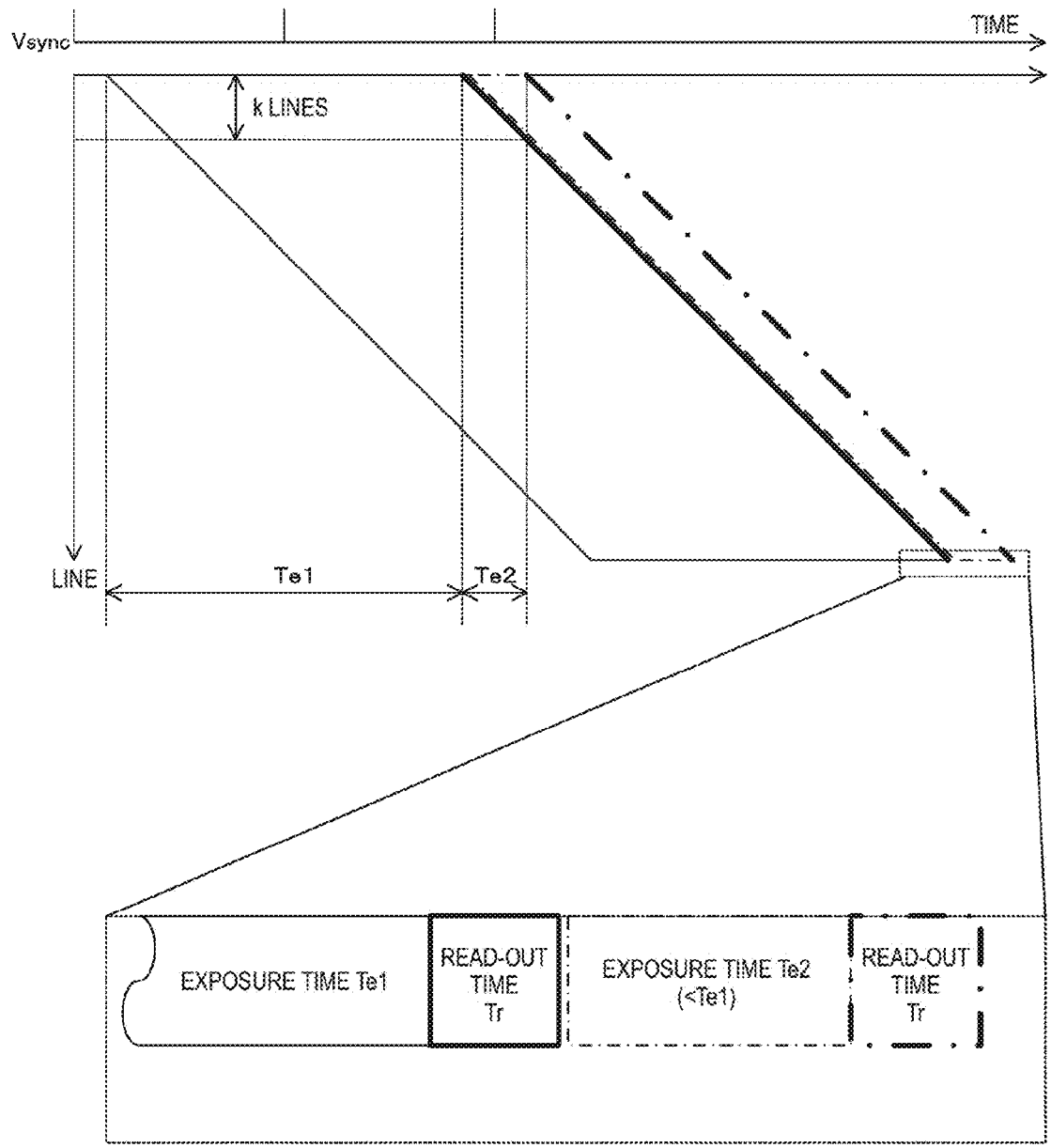
FIG. 6 is a timing chart illustrating an exemplary operation of the image capturing device in the first embodiment.

FIG. 6 is a timing chart illustrating an exemplary operation of the image capturing device 100 according to the first embodiment. In this figure, the horizontal axis represents time and the vertical axis represents the position of a row (line). The image capturing device 100 starts generation of the vertical synchronization signal Vsync, in one example, when an operation for image capturing is performed.

Figure 7:
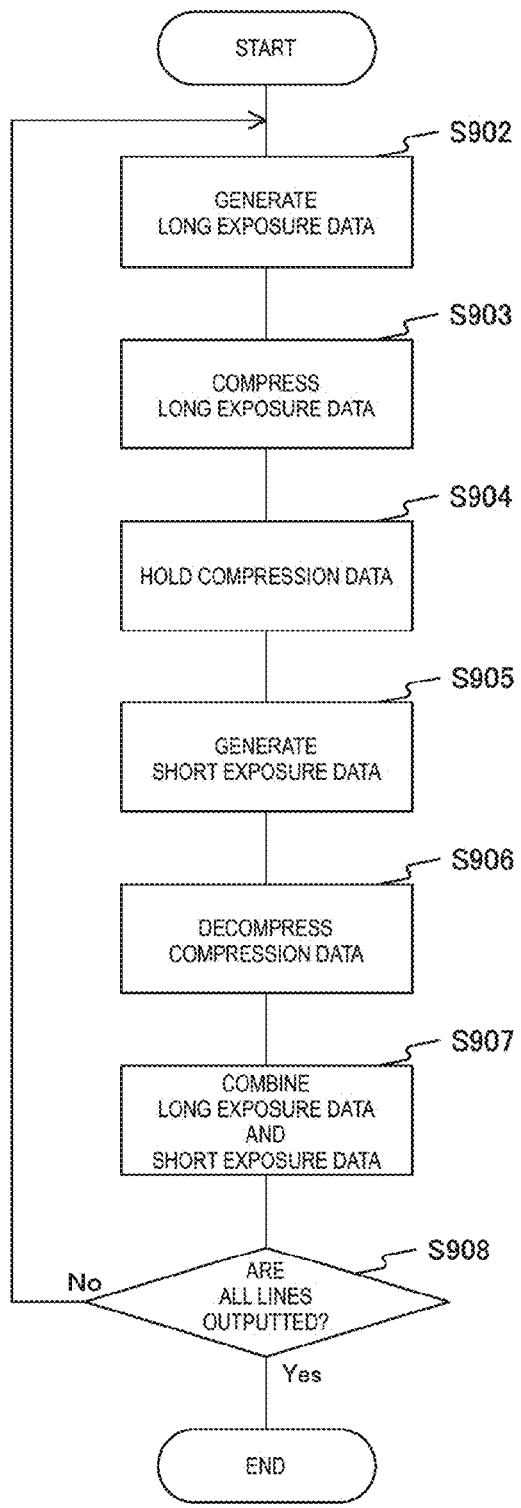
FIG. 7 is a flowchart illustrating an exemplary operation of the image capturing device in the first embodiment.

Then, in the first row, when a fixed time elapses from the image capturing timing indicated by the vertical synchronization signal, the image capturing device 100 starts the long exposure of the exposure time Te1. The long exposure on the second and subsequent rows starts when 1/fs seconds elapse from starting the exposure on the immediately preceding row. Then, when the long exposure is terminated, reading out of the long exposure data is started. When a predetermined read-out time Tr elapses, the reading out is completed. The image capturing device 100 compresses the long exposure data and holds in the buffer memory 320. In FIG. 7, the parallelogram enclosed by the solid line shows the exposure time period of long exposure for each row.

Furthermore, after the long exposure, the image capturing device 100 starts the short exposure of the exposure time Te2. Furthermore, the compression data held in the buffer memory 320 is decompressed in accordance with the decompression start signal, and the long exposure data is restored. When the short exposure is terminated, reading out of the short exposure data is started. When a predetermined read-out time Tr elapses, the reading out is completed. In FIG. 7, the parallelogram enclosed by the dashed-dotted line shows the exposure time period of short exposure for each row.

In the row from which the short exposure data is read out, the image capturing device 100 combines the long exposure data and the short exposure data in the row. The image capturing device 100 outputs image data that is composed of line data combined in each row.

In FIG. 6, the long exposure data of k lines that is read out in the exposure time Te2 is held in the buffer memory 320 in a compressed form. In this way, the long exposure data is held in the buffer memory 320 in the compressed form by the image capturing device 100, which makes it possible to reduce the memory capacity of the buffer memory 320 as compared with the case where it is held without being compressed. As the memory capacity decreases, the cost of the buffer memory 320 can be reduced. Furthermore, as the memory capacity decreases, the traffic between the buffer memory 320 and a circuit that accesses the buffer memory 320 can be reduced, resulting in a decrease in power consumption.

[Exemplary Operation of Image Capturing Device]

FIG. 7 is a flowchart illustrating an exemplary operation of the image capturing device 100 according to the first embodiment. The operation starts when a predetermined operation (e.g. depression of a shutter button) for starting image capturing is performed by the user, in one example.

The image capturing device 100 performs the long exposure to generate the long exposure data (step S902). The image capturing device 100 compresses the long exposure data to generate compression data (step S903). Furthermore, the image capturing device 100 holds the compression data in the buffer memory 320 over the delay time corresponding to the exposure time Te2 (step S904). Then, the image capturing device 100 performs the short exposure to generate the short exposure data (step S905).

Furthermore, the image capturing device 100 decompresses the compression data (step S906), and combines the short exposure data and the long exposure data (step S907). The image capturing device 100 determines whether line data is combined and outputted for all lines (step S908). If there is a line in which line data is not outputted (No in step S908), the image capturing device 100 returns processing back to step S902. On the other hand, if there is no line in which line data is not outputted (No in step S908), the image capturing device 100 terminates the operation for image capturing.

Figure 8:
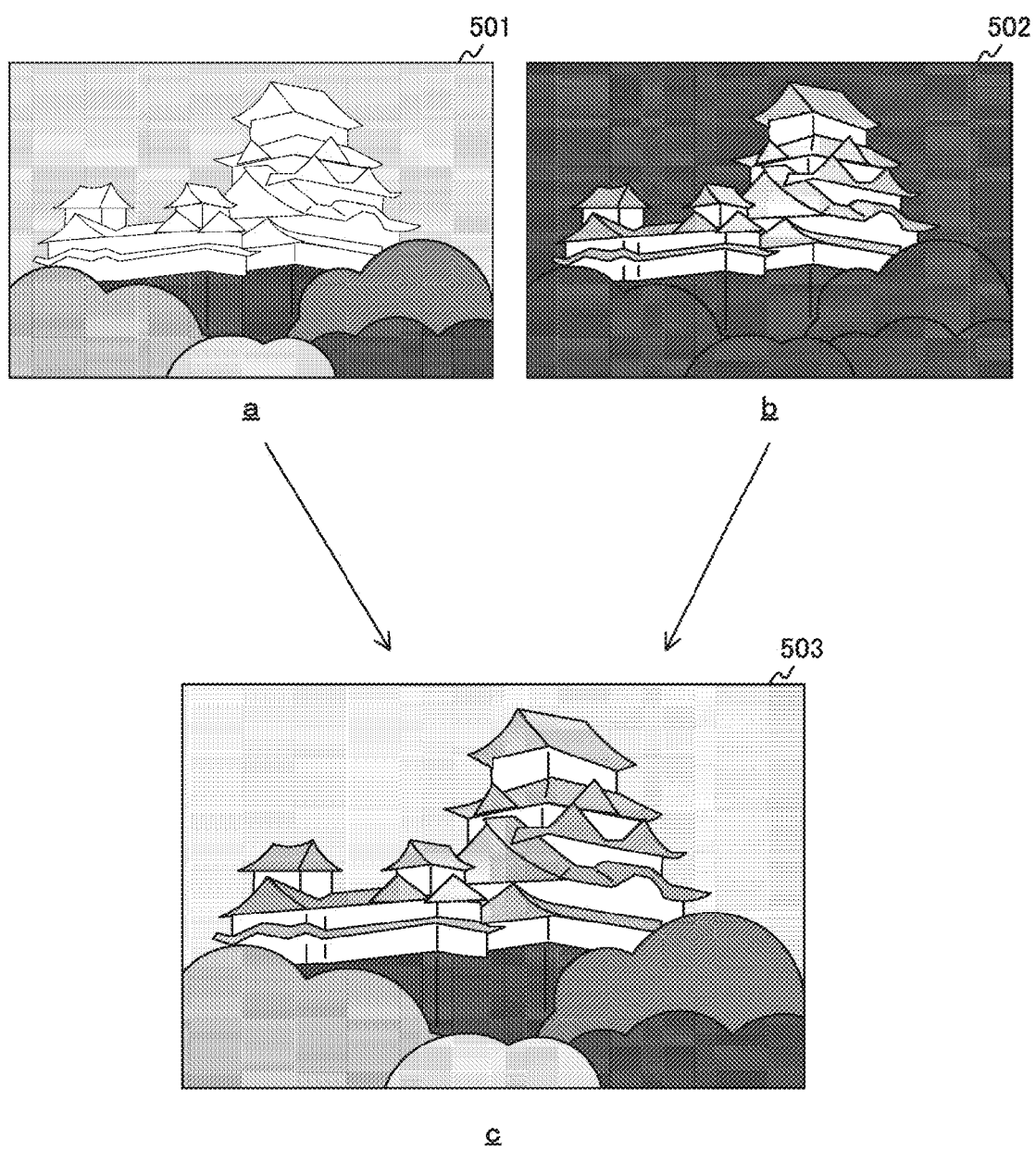
FIG. 8 is an example of image data before and after combination according to the first embodiment.

FIG. 8 is an example of image data before and after combination according to the first embodiment. In this figure, the portion a is an example of image data 501 composed of the long exposure data. In this figure, as illustrated in the portion a, if the long exposure is performed, a loss of gradation in a bright part (so-called "blown-out highlights") is likely to occur due to overexposure. In this figure, the portion b is an example of image data 502 composed of the short exposure data. In this figure, as illustrated in the portion a, if the short exposure is performed, a loss of gradation in a dark part (so-called "blocked-up shadows") is likely to occur due to underexposure.

In FIG. 8, the portion c is a view illustrating an example of image data 503 after combination. The combination of the image data 501 and 502 having different exposure times allows the image data 503 having a wider dynamic range to be obtained. This prevents occurrence of blown-out highlights or blocked-up shadows.

In this way, according to the first embodiment of the present technology, the image capturing device 100 compresses the long exposure data, holds it in a memory, decompresses the held compression data, and combines it with the short exposure data, thereby preventing an increase in the memory capacity.

[First Modification]

Although, in the first embodiment, the image capturing device 100 performs re-quantization processing and compresses the long exposure data, low-resolution conversion may be further performed during compression. An image capturing device 100 according to a first modification is different from that of the first embodiment in that low-resolution conversion may be further performed during compression.

Figure 9:
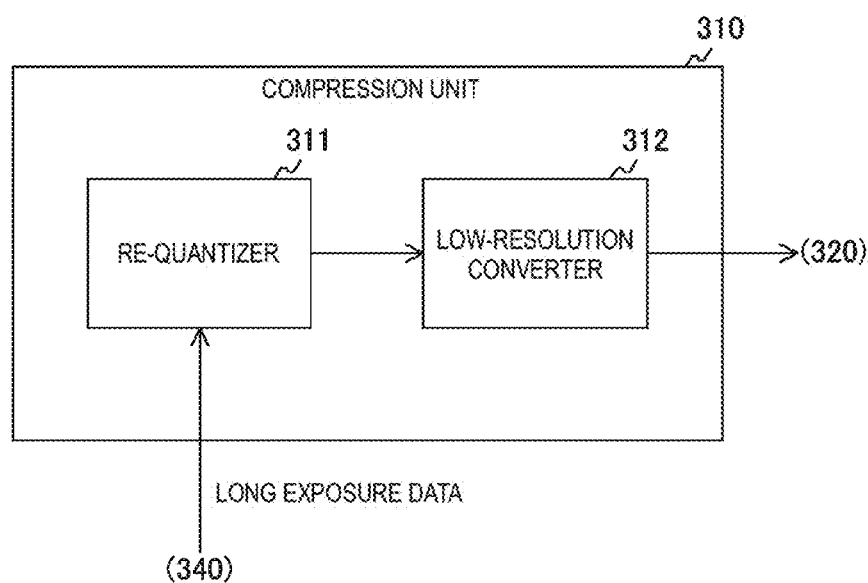
FIG. 9 is a block diagram illustrating an exemplary configuration of a compression unit and a decompression unit according to a first modification of the first embodiment.
Figure 9:
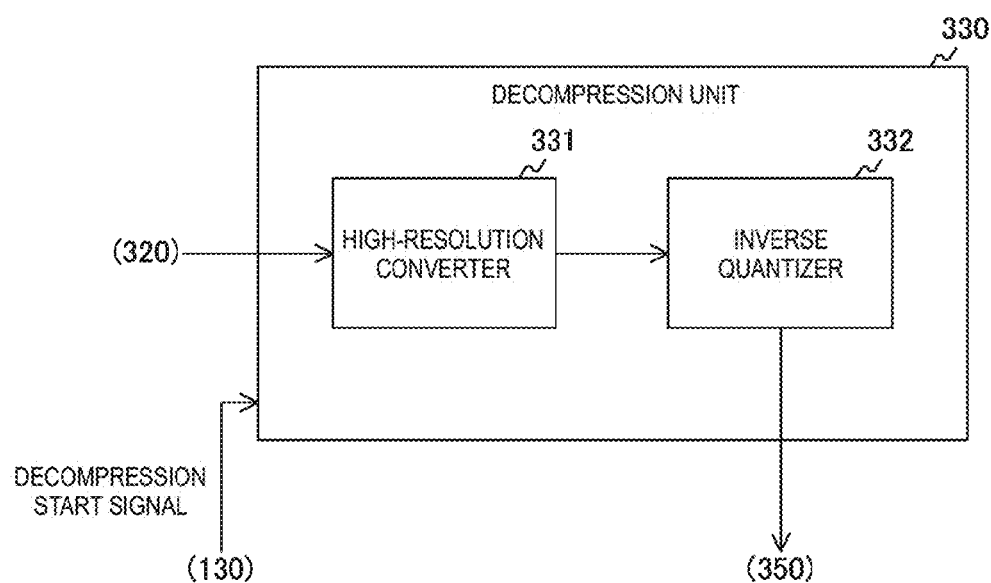

FIG. 9 is a block diagram illustrating an exemplary configuration of a compression unit 310 and a decompression unit 330 according to the first modification of the first embodiment. In this figure, the portion a is a block diagram illustrating an exemplary configuration of the compression unit 310 according to the first modification. The compression unit 310 according to the first modification is configured to further include a low-resolution converter 312, which is different from that of the first embodiment.

The low-resolution converter 312 performs a process of thinning out a fixed number of pixel data items in the long exposure data as low-resolution conversion processing. The low-resolution converter 312 supplies the long exposure data that is subject to the low-resolution conversion processing to be used as compression data to the buffer memory 320.

Moreover, the compression unit 310 performs both the re-quantization processing and the low-resolution conversion process, but it may perform only one of them. Furthermore, the compression unit 310 may further perform entropy encoding such as Huffman coding and arithmetic coding.

In FIG. 9, the portion b is a block diagram illustrating an exemplary configuration of the decompression unit 330 according to the first modification. The decompression unit 330 according to the first modification is configured to further include a high-resolution converter 331, which is different from that of the first embodiment.

The high-resolution converter 331 performs a process of interpolating new pixel data of the same number as the thinned-out pixel data in the compression data in accordance with the decompression start signal as high-resolution conversion processing. The high-resolution converter 331 supplies the compression data that is subject to the high-resolution conversion processing to the inverse quantizer 332.

Moreover, the decompression unit 330 performs both the inverse quantization processing and the high-resolution conversion process, but it may perform only one of them. Furthermore, the compression unit 310 may further perform entropy encoding such as Huffman coding and arithmetic coding.

In this way, according to the first modification, the image capturing device 100 can perform the low-resolution conversion, thereby further increasing the compression ratio.

[Second Modification]

Although, in the first modification, the image capturing device 100 compresses the long exposure data by using the re-quantization processing or the low-resolution conversion processing, the image capturing device 100 may further perform YC conversion for converting pixel data in the long exposure data into luminance and chrominance signals. The YC conversion makes it possible to increase the compression ratio of the color information. An image capturing device 100 according to a second modification is different from that of the first modification in that YC conversion may be further performed during compression.

Figure 10:
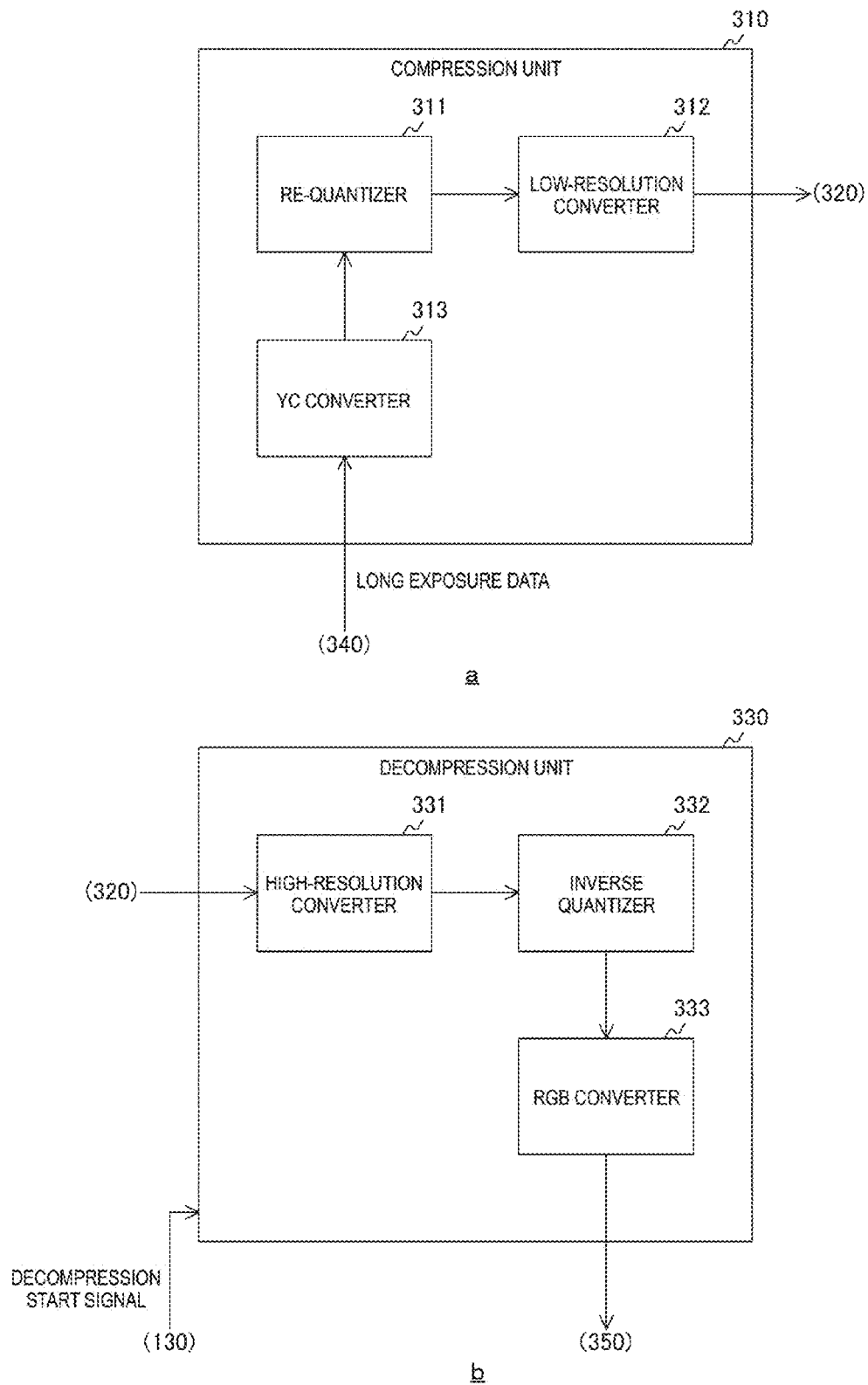
FIG. 10 is a block diagram illustrating an exemplary configuration of a compression unit and a decompression unit according to a second modification of the first embodiment.

FIG. 10 is a block diagram illustrating an exemplary configuration of a compression unit 310 and a decompression unit 330 according to the second modification of the first embodiment. In this figure, the portion a is a block diagram illustrating an exemplary configuration of the compression unit 310 according to the first modification. The compression unit 310 according to the second modification is configured to further include an YC converter 313, which is different from that of the first modification.

The YC converter 313 performs YC conversion on the long-term image data. The YC converter 313 performs YC conversion using the following Formulas based on the International Telecommunication Union Radiocommunication Sector (ITU-R) BT. 601 standard, in one example. The YC converter 313 supplies the long exposure that is subject to YC conversion to the re-quantizer 311.

$$Y = 0.299 \times R + 0.587 \times G + 0.144 \times B \quad \text{Formula (3)}$$

$$Cb = -0.168736 \times R - 0.331264 \times G + 0.5 \times B \quad \text{Formula (4)}$$

$$Cr = 0.5 \times R - 0.418688 \times G - 0.081312 \times B \quad \text{Formula (5)}$$

In the Formula (3), Y is the luminance signal. In the Formulas (4) and (5), Cr and Cb are chrominance signals.

Moreover, the compression unit 310 may further perform entropy encoding such as Huffman coding and arithmetic coding.

In FIG. 10, the portion b is a block diagram illustrating an exemplary configuration of the decompression unit 330 according to the second modification. The decompression unit 330 according to the second modification is configured to further include a RGB converter 333, which is different from that of the first embodiment.

The RGB converter 333 converts the chrominance signal and the luminance signal in data supplied from the inverse quantizer 332 into pixel data R, G, and B.

Moreover, the decompression unit 330 may further perform decoding of an entropy code such as Huffman code and arithmetic code.

In this way, according to the second modification, the image capturing device 100 performs YC conversion during compression of the long exposure, thereby further increasing the compression ratio of the color information.

[Third Modification]

Although, in the first embodiment, the image capturing device 100 compresses the long exposure data by using the re-quantization processing or the low-resolution conversion processing, the image capturing device 100 may further perform frequency conversion in the long exposure data. To achieve the frequency conversion, discrete cosine transform, Hadamard transform, Wavelet transform, or the like is used. The frequency conversion allows the compression ratio of the high frequency component to be increased. An image capturing device 100 according to a third modification is different from that of the first modification in that frequency conversion is further performed during compression.

Figure 11:
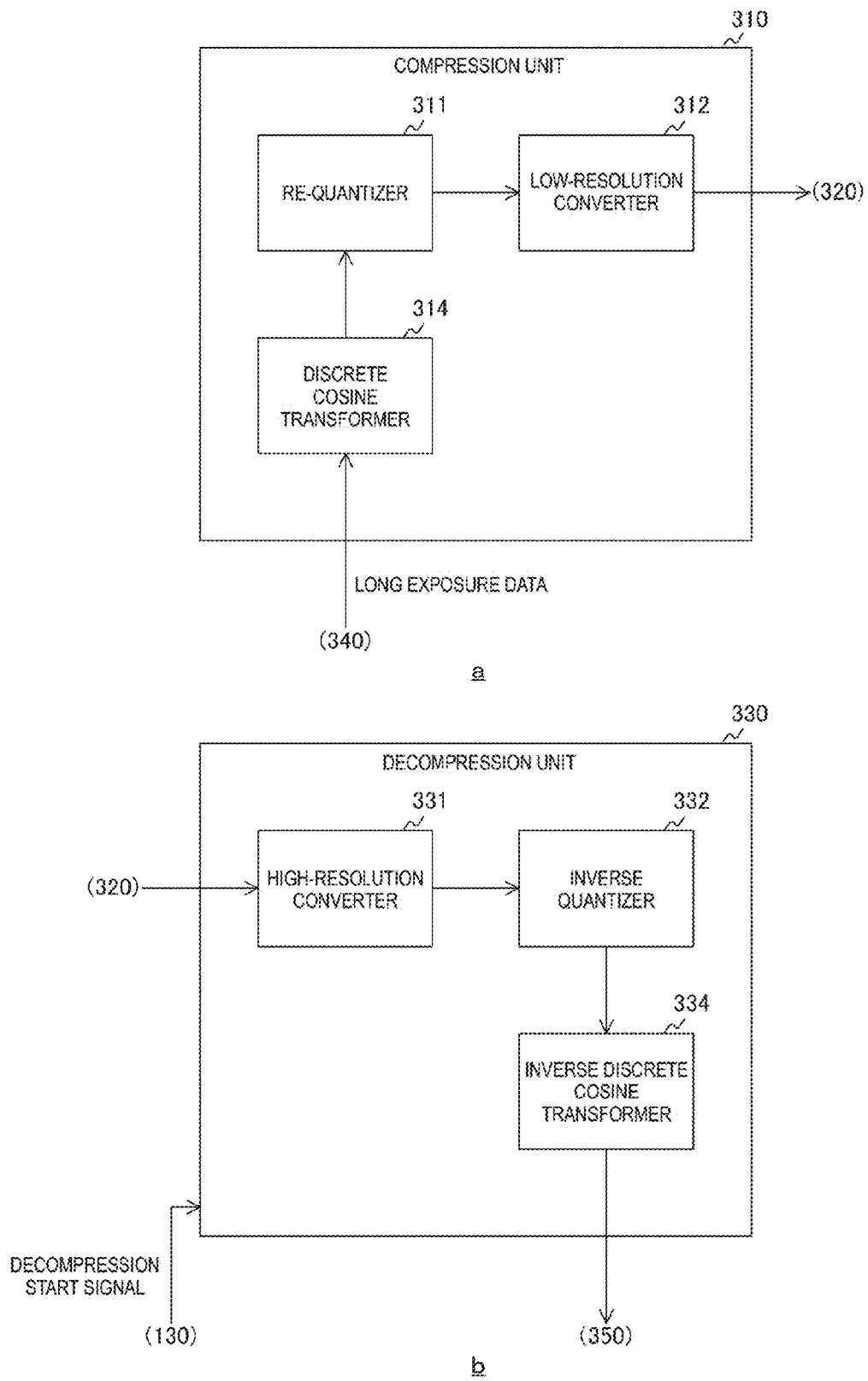
FIG. 11 is a block diagram illustrating an exemplary configuration of a compression unit and a decompression unit according to a third modification of the first embodiment.

FIG. 11 is a block diagram illustrating an exemplary configuration of a compression unit 310 and a decompression unit 330 according to the third modification of the first embodiment. In this figure, the portion a is a block diagram illustrating an exemplary configuration of the compression unit 310 according to the third modification. The compression unit 310 according to the third modification is configured to further include a discrete cosine transformer 314, which is different from that of the first modification.

The discrete cosine transformer 314 performs discrete cosine transform on the long exposure data. The discrete cosine transformer 314 supplies the long exposure that is subject to discrete cosine transform to the re-quantizer 311.

Moreover, the compression unit 310 may perform frequency conversion such as Hadamard transform and Wavelet transform rather than the discrete cosine transform. Furthermore, the compression unit 310 may further perform entropy encoding such as Huffman coding and arithmetic coding.

In FIG. 11, the portion b is a block diagram illustrating an exemplary configuration of the decompression unit 330 according to the third modification. The decompression unit 330 according to the third modification is configured to further include an inverse discrete cosine transformer 334, which is different from that of the first modification.

The inverse discrete cosine transformer 334 performs inverse transform of the discrete cosine transform on the data supplied from the inverse quantizer 332.

Moreover, the decompression unit 330 may perform inverse transform of the Hadamard transform and Wavelet transform rather than the inverse discrete cosine transform. Furthermore, the decompression unit 330 may further perform decoding of an entropy code such as Huffman code and arithmetic code.

In this way, according to the third modification, the image capturing device 100 can perform frequency conversion during compression of the long exposure, thereby further increasing the compression ratio of the high frequency component.

[Fourth Modification]

Although, in the first embodiment, the image capturing device 100 compresses the long exposure data at a fixed compression ratio, the compression ratio may vary depending on the exposure time. From the Formula (2), the shorter the delay time (Te2−Tc−Td), the less the number k of the line data items held in the buffer memory 320, thus the compression ratio can be reduced. The re-quantization processing described above is lossy compression processing, and as the compression ratio is reduced, the image quality of the image data is improved. An image capturing device 100 according to a fourth modification is different from that of the first modification in that the compression ratio varies depending on delay time.

Figure 12:
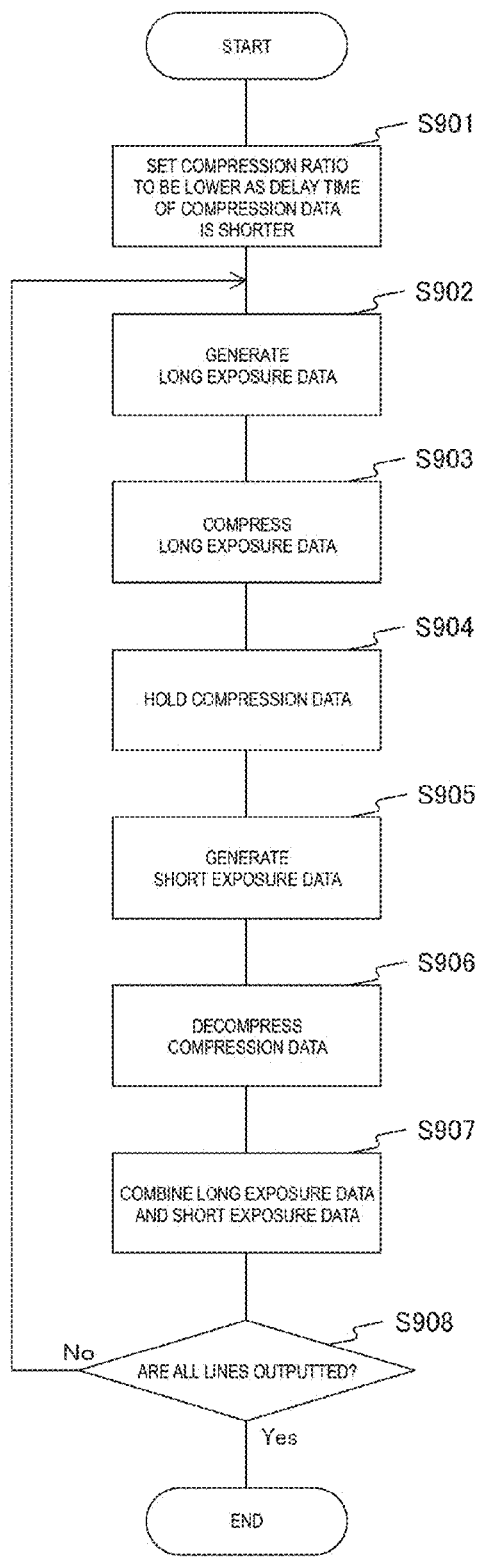
FIG. 12 is a flowchart illustrating an exemplary operation of an image capturing device according to a fourth modification of the first embodiment.

FIG. 12 is a flowchart illustrating an exemplary operation of the image capturing device 100 according to the fourth modification of the first embodiment.

In the image capturing device 100 according to the fourth modification, a compression ratio is set to be lower as the delay time is shorter (step S901), and executes step S902 and subsequent processing In this way, according to the fourth modification, the image capturing device 100 compresses the long exposure data at a compression ratio that is set to be lower as the delay time is shorter. Thus, as the delay time is shorter, it is possible to generate image data having higher image quality.

2. Second Embodiment

Although, in the first embodiment, the controller 130, the signal processor 300, and the image processor 120 are provided outside the image sensor 200, these components may be integrated into one chip. The controller 130, the signal processor 300, and the image processor 120 may be provided inside the image sensor 200. Such integration into one chip makes it possible to shorten the wiring between the controller 130, the signal processor 300, the image processor 120, and the circuitry in the image sensor 200. This makes it possible to reduce power consumption and cost of the image capturing device 100. An image capturing device 100 according to a second embodiment is different from that of the first embodiment in that the controller 130, the signal processor 300, and the image processor 120 are provided in the image sensor 200.

Figure 13:
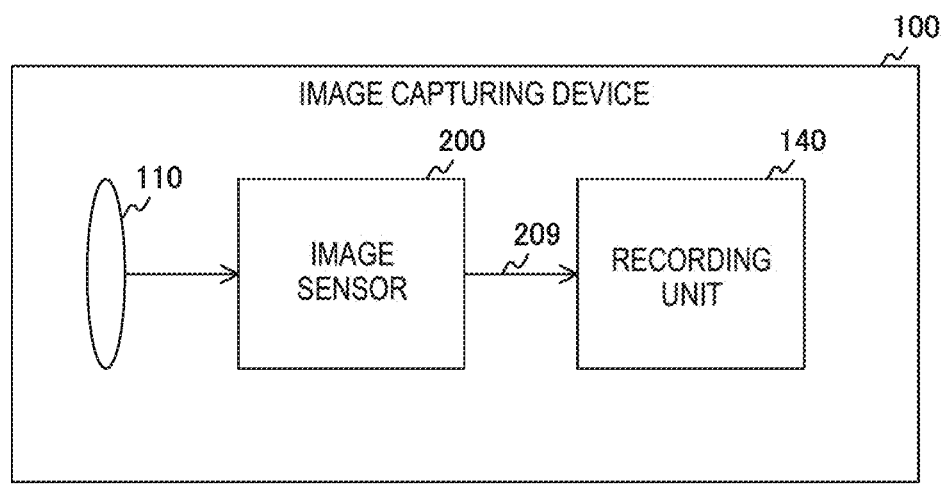
FIG. 13 is a block diagram illustrating an exemplary configuration of an image capturing device in a second embodiment.

FIG. 13 is a block diagram illustrating an exemplary configuration of the image capturing device 100 according to the second embodiment. The image capturing device 100 according to the second embodiment is different from that of the first embodiment in that the controller 130, the signal processor 300, and the image processor 120 are provided in the image sensor 200.

Figure 14:
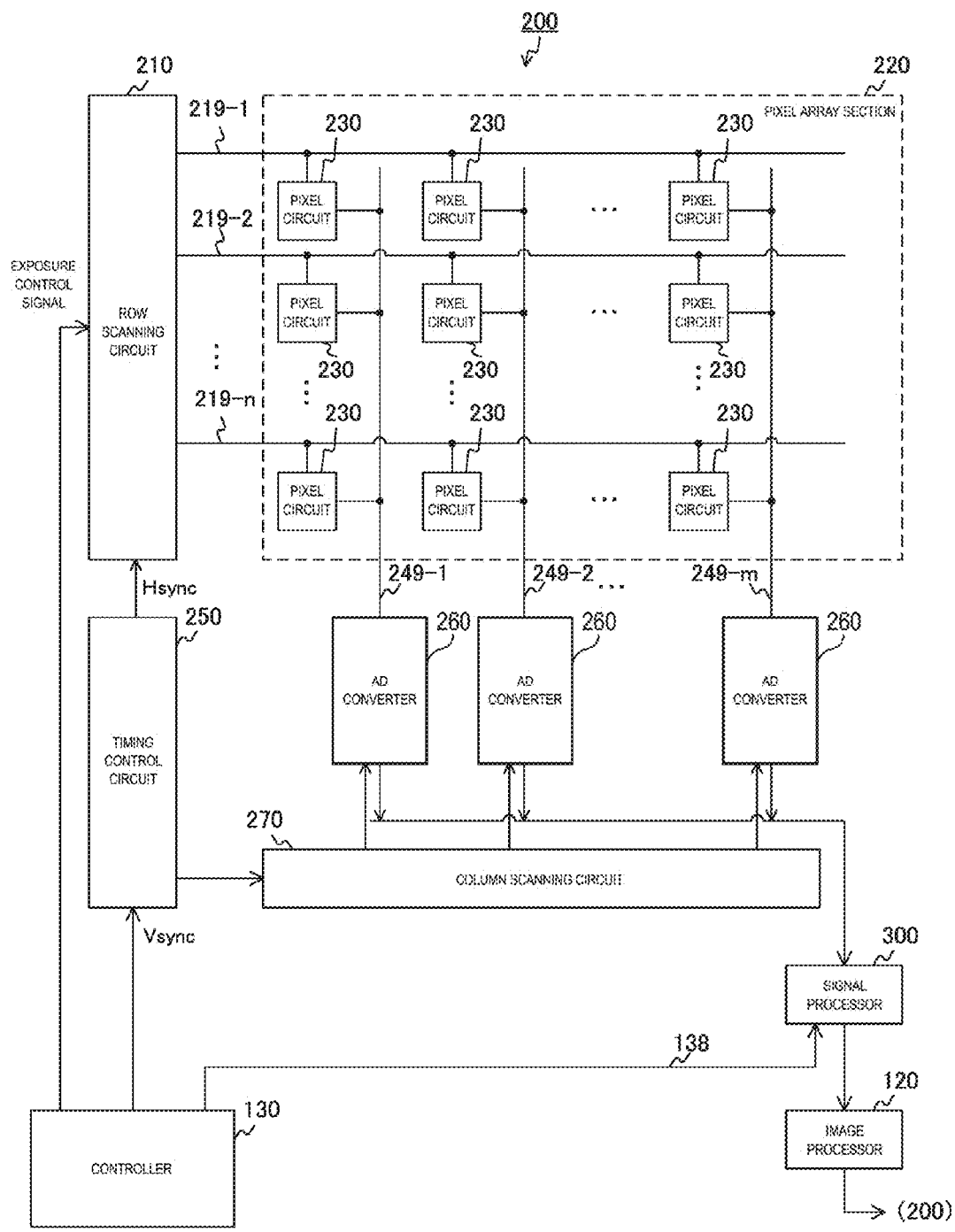
FIG. 14 is a block diagram illustrating an exemplary configuration of an image capturing device in the second embodiment.

FIG. 14 is a block diagram illustrating an exemplary configuration of the image sensor 200 according to the second embodiment. The image sensor 200 according to the second embodiment is configured to further include the controller 130, the signal processor 300, and the image processor 120, which is different from that of the first embodiment. Moreover, in the image sensor 200, a row scanning circuit 210, a pixel array section 220, a timing control circuit 250, an AD converter 260, and a column scanning circuit 270 are examples of a data generation unit described in the claims.

In this way, according to the second embodiment of the present technology, the image sensor 200, the controller 130, the signal processor 300, and the image processor 120 are integrated with each other, and thus it is possible to shorten the wiring between the circuitry in the image sensor 200 and the signal processor 300. This makes it possible to reduce power consumption and cost of the image capturing device 100.

3. Third Embodiment

Although, in the first embodiment, the image sensor 200 is formed on one substrate, circuits in the image sensor 200 may be arranged to be distributed onto a plurality of substrates and these substrates may be stacked on top of each other. Such stack-like arrangement makes it possible to reduce the area of the image sensor 200. An image sensor 200 according to a third embodiment is different from that of the first embodiment in that each circuit is provided on a plurality of stacked substrates.

Figure 15:
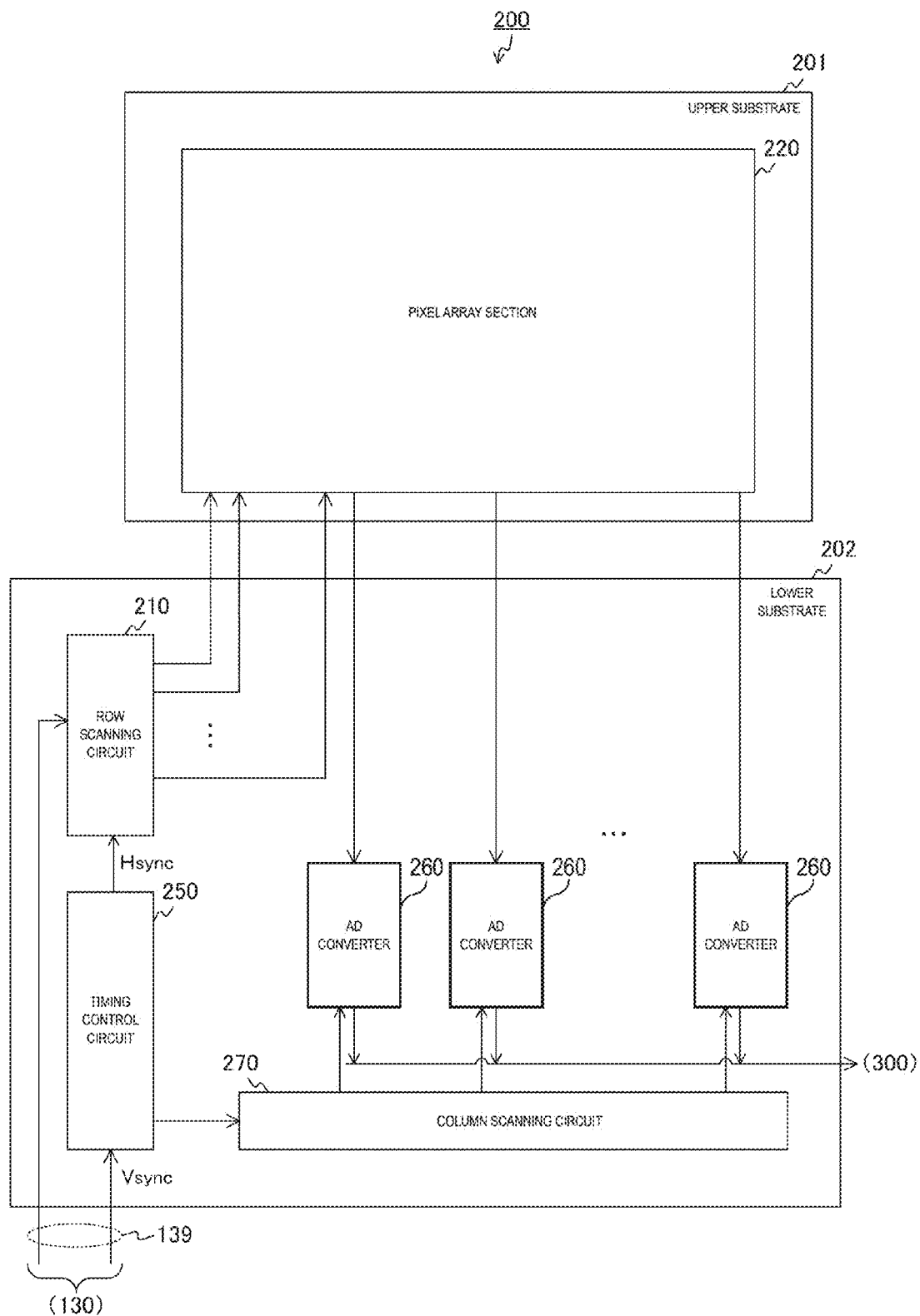
FIG. 15 is a block diagram illustrating an exemplary configuration of an image capturing device in a third embodiment.

FIG. 15 is a block diagram illustrating an exemplary configuration of the image sensor 200 according to the third embodiment. The image sensor 200 according to the third embodiment is configured to include an upper substrate 201 and a lower substrate 202.

The upper substrate 201 is a substrate arranged on top of the lower substrate 202, and is provided with the pixel array section 220. On the other hand, the lower substrate 202 is provided with the row scanning circuit 210, the timing control circuit 250, the AD converter 260, and the column scanning circuit 270.

Moreover, the circuits that are arranged on the upper substrate 201 and the lower substrate 202 are not limited to those illustrated in FIG. 15. In one example, another AD converter 260 may be provided on the upper substrate 201. Furthermore, the AD converter 260 of the upper substrate 201 may be provided with a comparator, and the AD converter 260 of the lower substrate 202 may be provided with a counter.

In this way, according to the third embodiment of the present technology, the circuits in the image sensor 200 are arranged to be distributed onto a plurality of stacked substrates, and thus it is possible to reduce the area of the image sensor 200.

The above-described embodiments are examples for embodying the present technology, and matters in the embodiments each have a corresponding relationship with disclosure-specific matters in the claims. Likewise, the matters in the embodiments and the disclosure-specific matters in the claims denoted by the same names have a corresponding relationship with each other. However, the present technology is not limited to the embodiments, and various modifications of the embodiments may be embodied in the scope of the present technology without departing from the spirit of the present technology.

The processing sequences that are described in the embodiments described above may be handled as a method having a series of sequences or may be handled as a program for causing a computer to execute the series of sequences and recording medium storing the program. As the recording medium, a compact disc (CD), a minidisc (MD), and a digital versatile disk (DVD, a memory card, and a Blu-ray disc (registered trademark) can be used.

In addition, the effects described in the present specification are not limiting but are merely examples, and there may be additional effects.

Additionally, the present technology may also be configured as below.

(1)

An image capturing device including:

a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing;

a compression unit configured to compress the long exposure data to generate compression data;

a memory configured to hold the compression data over delay time corresponding to the shorter time period of the two exposure time periods;

a decompression unit configured to decompress the held compression data to restore the long exposure data; and a combination unit configured to combine the restored long exposure data and the short exposure data.

(2)

The image capturing device according to (1), wherein the compression unit compresses the long exposure data at a compression ratio that is set to be lower as the delay time is shorter.

(3)

The image capturing device according to (1) or (2), wherein each of the plurality of pixel data items has a data size that is a predetermined size, the compression unit allows the data size of each of the plurality of pixel data items in the long exposure data to be smaller than the predetermined size, and the decompression unit sets the data size of each of the pixel data items in the compression data back to the predetermined size.

(4)

The image capturing device according to any one of (1) to (3), wherein the compression unit thins out a predetermined number of the pixel data items in the long exposure data, and the decompression unit interpolates new pixel data of the predetermined number in the compression data.

(5)

The image capturing device according to any one of (1) to (4), wherein each of the plurality of pixel data items includes one of pixel values of red, green, and blue, the compression unit generates a chrominance signal and a luminance signal from each of the pixel values, and the decompression unit generates each of the pixel values of red, green, and blue from the chrominance signal and the luminance signal.

(6)

The image capturing device according to any one of (1) to (5), wherein the compression unit performs frequency conversion on the long exposure data, and the decompression unit performs inverse frequency conversion on the compression data.

(7)

The image capturing device according to any one of (1) to (6), wherein the compression unit encodes each of the plurality of pixel data items in the long exposure data into an entropy code, and the decompression unit decodes each of the entropy codes into the pixel data.

(8)

The image capturing device according to any one of (1) to (7), wherein the data generation unit includes a plurality of pixels provided on a first substrate, and a data generation circuit configured to execute the long exposure processing and the short exposure processing on a second substrate being different from the first substrate.

(9)

An image sensor including:

a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing;

a compression unit configured to compress the long exposure data to generate compression data;

a memory configured to hold the compression data over delay time corresponding to the shorter time period of the two exposure time periods;

a decompression unit configured to decompress the held compression data to restore the long exposure data; and a combination unit configured to combine the restored long exposure data and the short exposure data.

(10)

A method of controlling an image capturing device, the method including:

a long exposure step of generating, by a data generation unit, data including a plurality of pixel data items as long exposure data by performing exposure over a longer time period of two different exposure time periods;

a short exposure step of generating, by a data generation unit, data including a plurality of pixel data items as short exposure data by performing exposure over a shorter time period of the two different exposure time periods after the long exposure processing;

a compression step of compressing, by a compression unit, the long exposure data to generate compression data;

a delaying step of holding, by a memory, the compression data over delay time corresponding to the shorter time period of the two exposure time periods;

a decompression step of decompressing, by a decompression unit, the held compression data to restore the long exposure data; and a combining step of combining, by a combination unit, the restored long exposure data and the short exposure data.

REFERENCE SIGNS LIST 100 image capturing device
110 image capturing lens
120 image processor
130 controller
140 recording unit
200 image sensor
201 upper substrate
202 lower substrate
210 row scanning circuit
220 pixel array section
230 pixel circuit
231 photodiode 232 transfer transistor
233 reset transistor
234 floating diffusion layer
235 amplification transistor
236 selection transistor
250 timing control circuit
260 AD converter
270 column scanning circuit
300 signal processor
310 compression unit
311 re-quantizer
312 low-resolution converter
313 YC converter
314 discrete cosine transformer
320 buffer memory
330 decompression unit
331 high-resolution converter
332 inverse quantizer
333 RGB converter
334 inverse discrete cosine transformer
340 switching unit
350 combination unit

The invention claimed is:

1. An image capturing device comprising:
a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing;
a compression unit configured to compress the long exposure data to generate compression data;
a memory configured to hold the compression data over delay time corresponding to the shorter time period of the two exposure time periods;
a decompression unit configured to decompress the held compression data to restore the long exposure data; and
a combination unit configured to combine the restored long exposure data and the short exposure data,
wherein the compression unit compresses the long exposure data at a compression ratio that is set to be lower as the delay time is shorter.

2. The image capturing device according to claim 1, wherein
each of the plurality of pixel data items in the long exposure data has a data size that is a predetermined size,
the compression unit allows the data size of each of the plurality of pixel data items in the long exposure data to be smaller than the predetermined size, and
the decompression unit sets the data size of each of the pixel data items in the compression data back to the predetermined size.

3. The image capturing device according to claim 1, wherein
the compression unit thins out a predetermined number of the pixel data items in the long exposure data, and
the decompression unit interpolates new pixel data of the predetermined number in the compression data.

4. The image capturing device according to claim 1, wherein
each of the plurality of pixel data items in the long exposure data includes one of first pixel values of red, green, and blue,
the compression unit generates a chrominance signal and a luminance signal from each of the pixel values in the long exposure data, and
the decompression unit generates second pixel values of red, green, and blue from the chrominance signals and the luminance signals.

5. The image capturing device according to claim 1, wherein
the compression unit performs frequency conversion on the long exposure data, and
the decompression unit performs inverse frequency conversion on the compression data.

6. The image capturing device according to claim 1, wherein
the compression unit encodes each of the plurality of pixel data items in the long exposure data into an entropy code, and
the decompression unit decodes each of the entropy codes into decoded pixel data.

7. The image capturing device according to claim 1, wherein
the data generation unit includes
a plurality of pixels provided on a first substrate, and
a data generation circuit configured to execute the long exposure processing and the short exposure processing on a second substrate being different from the first substrate.

8. An image sensor comprising:
a data generation unit configured to execute long exposure processing and short exposure processing in sequence, the long exposure processing being performed to generate data including a plurality of pixel data items as long exposure data by performing exposure over a longer time period of two different exposure time periods, the short exposure processing being performed to generate data including a plurality of pixel data items as short exposure data by performing exposure over a shorter time period of the two different exposure time periods after the long exposure processing;
a compression unit configured to compress the long exposure data to generate compression data;
a memory configured to hold the compression data over delay time corresponding to the shorter time period of the two exposure time periods;
a decompression unit configured to decompress the held compression data to restore the long exposure data; and
a combination unit configured to combine the restored long exposure data and the short exposure data,
wherein the compression unit compresses the long exposure data at a compression ratio that is set to be lower as the delay time is shorter.

9. A method of controlling an image capturing device, the method comprising:
a long exposure step of generating, by a data generation unit, data including a plurality of pixel data items as long exposure data by performing exposure over a longer time period of two different exposure time periods;
a short exposure step of generating, by a data generation unit, data including a plurality of pixel data items as short exposure data by performing exposure over a shorter time period of the two different exposure time periods after the long exposure step;
a compression step of compressing, by a compression unit, the long exposure data to generate compression data;
a delaying step of holding, by a memory, the compression data over delay time corresponding to the shorter time period of the two exposure time periods;

a decompression step of decompressing, by a decompression unit, the held compression data to restore the long exposure data; and a combining step of combining, by a combination unit, the restored long exposure data and the short exposure data, wherein the compression step comprises compressing the long exposure data at a compression ratio that is set to be lower as the delay time is shorter.

* * * * *